2 Sheets—Sheet 2.
R. WERDERMANN.
Electro-Magnetic Traction Devices for
Locomotives, &c.
No. 199,885. Patented Jan. 29, 1878.
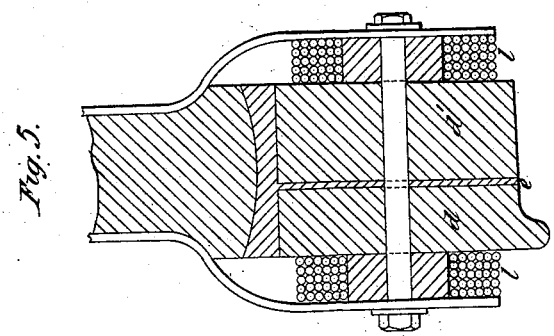
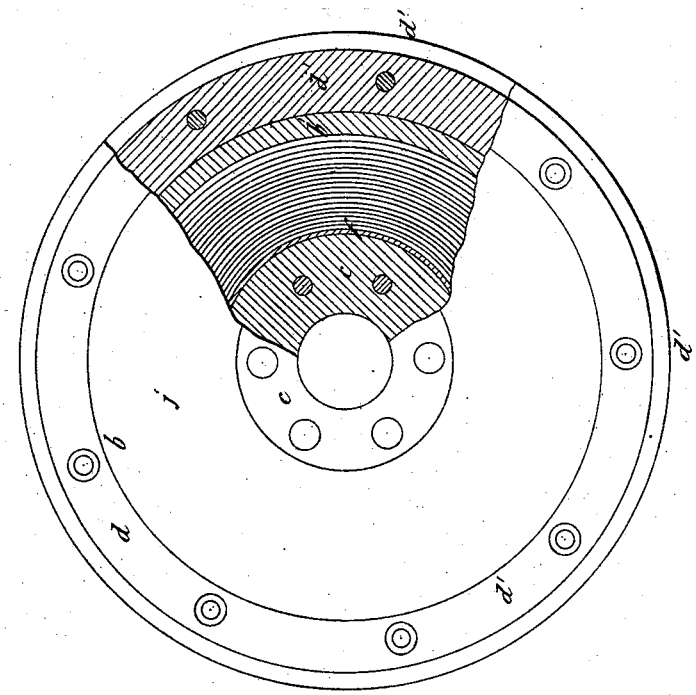
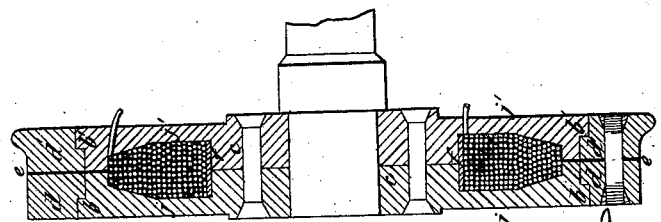
Attest:
Charles Thurman,
Lew Seely
Inventor
Richard Werdermann
by Geo. W. Dyer
atty.

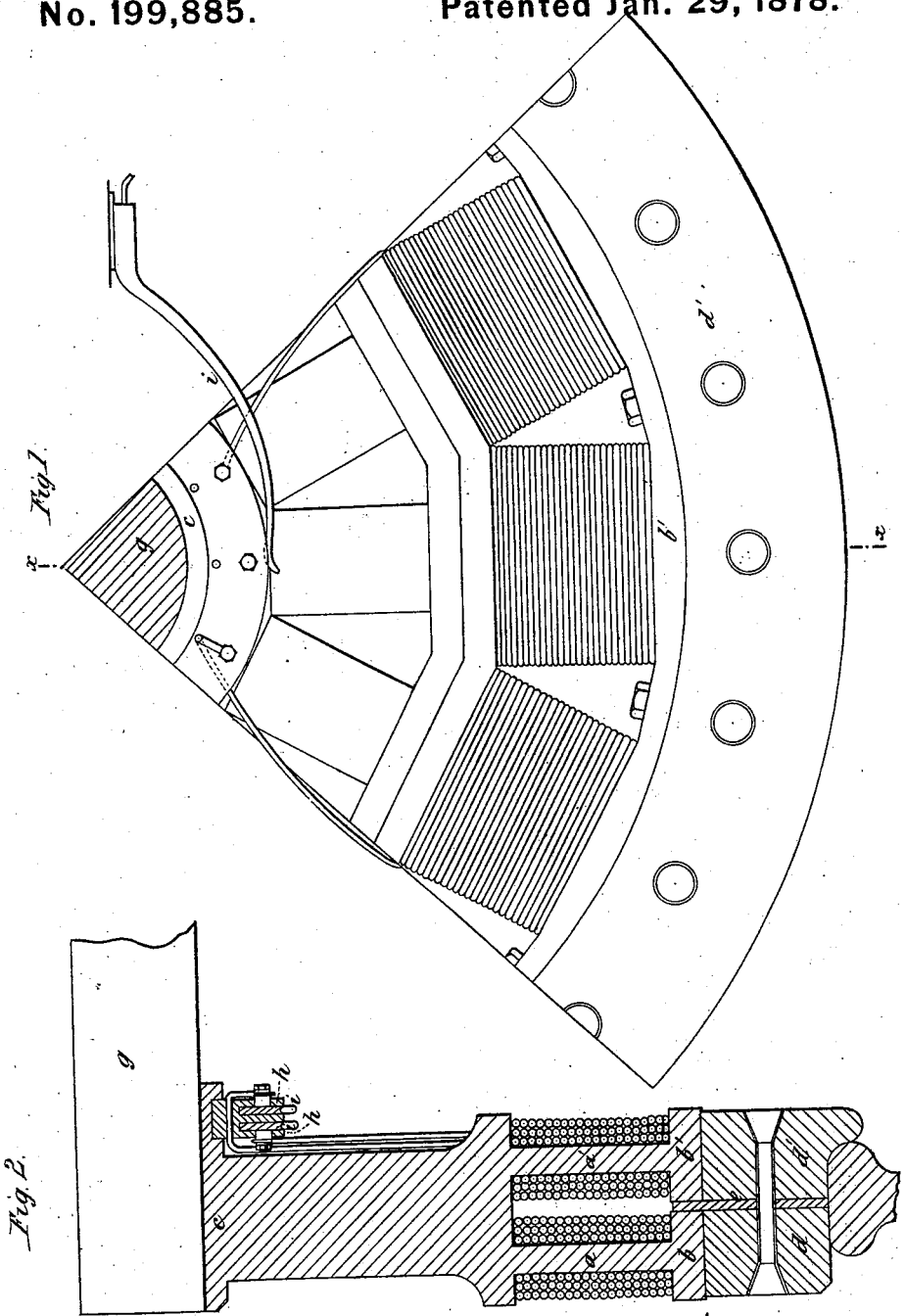

UNITED STATES PATENT OFFICE.

RICHARD WERDERMANN, OF LONDON, ENGLAND.

IMPROVEMENT IN ELECTRO-MAGNETIC TRACTION DEVICES FOR LOCOMOTIVES, &c.

Specification forming part of Letters Patent No. 199,885, dated January 29, 1878; application filed April 4, 1876.

*To all whom it may concern:*

Be it known that I, RICHARD WERDERMANN, of London, England, civil engineer, have invented Improvements in Wheels for Tractive and other purposes, of which the following is a specification:

My invention relates to improvements in the construction of wheels, in which I make use of electro-magnetism as the agent for effecting the object of the said invention, which is to obtain great adhesive or frictional power.

The essential feature of my invention is the division of the rim or outer portion of the wheel into two or more separate parts, each of which may be said to be a separate wheel, and each of which parts forms one pole of a magnet, whose armature may be a railroad-rail, or another wheel, or roller, or other object, according to the purpose for which the said invention is applied.

The accompanying drawings illustrate various forms in which my invention may be embodied; but I wish it understood that the said invention may be carried into effect in a great many different forms, but in all the forms or modifications thereof the tire or rim of the wheel must be a magnet, the poles of which attract the armature in the line of contact with the wheel.

Figure 1 is a side elevation of a portion of a railway-locomotive wheel, showing my invention applied to the same. Fig. 2 is a transverse section on the line $x\,x$, Fig. 1, showing a portion of the axle. Fig. 3 is a side elevation, partly in section, and Fig. 4 is a transverse section of a railway-wheel, showing my said invention in a modified form. Fig. 5 is a transverse section of a portion of a wheel, showing still further modifications of my said invention.

Like letters indicate the same parts throughout the drawings.

My improved wheel, as shown in Figs. 1 and 2, is constructed as follows—that is to say, the wheel is provided with a double series of spokes, $a\,a'$, and two fellies, $b\,b'$, the spokes of one series being placed parallel to those of the other series; or, in other words, the said wheel may be said to be two wheels placed side by side, in close proximity to each other, and fixed on the same boss or hub $c$.

The spokes $a\,a'$ of the wheel are coiled with insulated metal wire or ribbon in such a manner that when an electric current flows through this circuit one felly becomes the north pole and the other felly the south pole of an electro-magnet. In this and other cases where the wheel is provided with a tire, the latter must also be made in two parts, $d\,d'$, insulated from each other, as at $e$—that is to say, each wheel or division $b\,b'$ of the wheel must have its own tire. Around the boss $c$ of the wheel or around the axle $g$ are arranged two disks, $h$, of copper or other conducting material, insulated from each other and from the said boss or axle. One of these disks is connected with one end of the wire surrounding the spokes, and the other disk is connected with the other end of the same wire. Two springs, $i$, or rollers, which are in contact with the disks $h$, are connected with the two poles of a battery or other generator of electricity, arranged in any convenient position, as will be well understood by all familiar with electro-magnetic apparatus.

Now, when an electric current flows through the circuit formed by the coils surrounding the spokes, the whole of the tire or rim becomes a powerful electro-magnet, the two poles of which are represented by the two parts $d\,d'$ of the tire or rim.

Instead of two poles, the magnetic tire or rim may have three or more poles—that is to say, the wheel may have three or more series of spokes, and three or more rims or tires; and instead of placing the series of spokes parallel to each other, they may be arranged alternately.

Instead of constructing the wheel with series of spokes, I may construct it as shown in Figs. 3 and 4, in which $j\,j'$ are circular plates or disks of iron or steel formed or fitted on the same boss $c$, and upon that part of the boss lying between the disks, surrounded by a thin iron cylinder, $f$, is coiled the metal wire or ribbon.

The rim, felly, or outer portion is divided into two parts, $d\,d'$, each of which, with its disk, may be said to form a separate wheel; and it will be observed that the said two rims or fellies, or the tire parts of the rim or felly, are separated only by a very thin piece of insulating material, as shown at $e$, while the two disks in the body of the wheel are separated from each other by a considerable space filled by the said wire or ribbon. This construction of the wheel enables me to obtain a very powerful electro-magnet without incurring the disadvantage or inconvenience of a wide separation of the two rims or two parts of the rim.

I wish it understood that I do not limit myself to any particular form or construction of the various parts of my wheel so long as the peculiar features herein set forth are embodied therein, although the forms or modifications of my said invention which I have shown in the accompanying drawings are those which I believe to be the most advantageous for carrying the said invention into practice.

In Fig. 5 my said invention is carried into effect, as follows: The rim or tire is divided into two parts, $d\ d'$, as above described, insulated from each other at $e$, these parts $d\ d'$ being magnetized by a series of coils, $l$, placed at suitable distances apart all around the two parts $d\ d'$ of the rim or tire, and connected by suitable wires to the aforesaid disks, or otherwise placed in the proper communication with the generator of electricity.

Moreover, the electric circuit may be divided into two or more parts, through all of which the electric current may be caused to pass simultaneously, or to pass successively through one, two, or more of them at the same time. For this purpose the said disks are divided into as many insulated parts as there are circuits, and if the current is intended to flow through two or more circuits, or to magnetize two or more spokes at the same time, the corresponding parts of the disks must be overlapped.

I may accomplish the object of my invention by using permanent magnets instead of electro-magnets; but the latter will produce the greatest effect.

The insulating material between the two parts of the tire or rim may be made of greater diameter than the latter, to form a flange, which, moving in a groove in the armature, whether the latter is a rail or another wheel, pulley, or roller, prevents any lateral displacement of the wheel.

I claim as my invention—

The construction of a wheel with its rim, felly, or tire divided throughout its circumference into two or more parts, insulated from each other and provided with suitable conductors, so that each of the said parts or divisions forms one pole of an electro-magnet.

R. WERDERMANN.

Witnesses:
  W. D. WALBRIDGE,
  WM. ROBT. RAKE.